(12) United States Patent
Van Rooyen (10) Patent No.: US 7,775,155 B2
(45) Date of Patent: Aug. 17, 2010

(54) ROTARY COOKER FOR USE WITH CHAMFERED, STACKABLE CANS

(75) Inventor: Arthur Shields Van Rooyen, Wellington (ZA)

(73) Assignee: H. G. Molenaar & Company (Pty) Ltd (ZA)

( * ) Notice: Subject to any disclaimer, the term of this patent is extended or adjusted under 35 U.S.C. 154(b) by 472 days.

(21) Appl. No.: 11/794,692

(22) PCT Filed: Jan. 30, 2006

(86) PCT No.: PCT/IB2006/001575

§ 371 (c)(1),
(2), (4) Date: Jul. 3, 2007

(87) PCT Pub. No.: WO2006/117685

PCT Pub. Date: Nov. 9, 2006

(65) Prior Publication Data

US 2009/0205510 A1    Aug. 20, 2009

(30) Foreign Application Priority Data

Feb. 2, 2005    (ZA) ................................ 2005/0944

(51) Int. Cl.
*A23L 3/06* (2006.01)

(52) U.S. Cl. ........................... 99/365; 99/363; 211/59.2

(58) Field of Classification Search ................ 211/59.2, 211/85.18, 162, 312 R; 99/365; 312/42, 312/45; 219/429, 725
See application file for complete search history.

(56) References Cited

U.S. PATENT DOCUMENTS

| | | | | |
|---|---|---|---|---|
| 1,445,196 A | * | 2/1923 | Berry | 99/363 |
| 2,852,327 A | * | 9/1958 | Mason | 312/45 |
| 3,499,539 A | * | 3/1970 | Fisher | 211/59.2 |

* cited by examiner

*Primary Examiner*—Tu B Hoang
*Assistant Examiner*—Jianying Atkisson
(74) *Attorney, Agent, or Firm*—Bruce H Johnsonbaugh

(57) ABSTRACT

A rotary cooker and/or sterilizer is provided with a novel rail design to facilitate processing of chamfered, stackable cans and which prevents damage to the protective coating of chamfered, stackable cans which occurs in prior art rotary cookers. A split rail is provided having an inclined track for carrying and guiding one end of chamfered, stackable cans and a flat track for carrying and guiding the other ends of the cans so that the side wall of each can does not contact the rail and is not subjected to the abrasion of the side wall of the can otherwise caused by prior art flat rails used to carry and guide both ends of the cans. The rail design includes flanges for limiting side-to-side motion of the cans as well as rail segments which are placed in the rotary cooker wherein each rail segment supports and guides the top ends of cans in one row of cans and the bottom ends of cans moving in an adjacent row of cans.

1 Claim, 8 Drawing Sheets

Fig. 4

PRIOR ART

ROTARY COOKER FOR USE WITH CHAMFERED, STACKABLE CANS

CROSS-REFERENCE TO RELATED APPLICATION

This application claims the benefit of and priority from South Africa provisional patent application No. 2005/0944 filed on Feb. 2, 2005.

BACKGROUND AND BRIEF SUMMARY OF INVENTION

The present invention relates generally to continuous operation, industrial rotary cookers and/or sterilizers, referred to herein collectively as "rotary cookers." More particularly, as described below, the present invention provides a rotary cooker capable of processing chamfered, stackable cans with little or no risk of can damage, leading to corrosion and contamination of contents which may otherwise occur with prior art rotary cookers. Continuous rotary cookers have been widely used for at least 45 years and are often used for cooking cans filled with food products. Over the years, the shape of the cans used in rotary cookers has been relatively standard—a single cylinder with outwardly projecting seams around the upper and lower edges. Over the past several years, a chamfered stackable can design has become increasingly popular due to its ease and efficiency of storage and handling.

However, a potentially serious problem arose when rotary cookers utilizing a prior art flat rail or track were utilized to process the newer, chamfered cans. When the modern style of chamfered tin can is moved along a prior art flat track, a part of the side wall of the can frequently contacts and frictionally engages the track. The frictional engagement and rubbing of the side wall of the can against the track may pierce or abrade the relatively thin protective coating on the exterior of the can. Once the protective coating has been pierced, the tin can may corrode, the contents may become contaminated and result in serious health hazards for consumers and liability issues for the canning and food companies involved.

The prior art has utilized several approaches in an attempt to avoid or minimize the above-described risk of corrosion and contamination. One approach is to use lubricants to try to protect the chamfered cans. Such lubricants are expensive, difficult to apply and may complicate the labeling of cans with lubricant on the surface of the cans. Another approach in the prior art is to perform batch cooking and/or sterilizing of cans. However, the batch cooking technique is much more labor intensive and less reliable than a continuous rotary cooker. More labor is required, because the cans must be loaded and unloaded from a batch cooker individually, whereas in a continuous rotary cooker the cans are automatically fed into and removed from the cooker. Another possible remedy considered by the prior art is to utilize either heavier gauge cans or thicker protective coatings, both of which would significantly increase the cost of the finished product. A further possible remedy considered in the prior art is the use of inspection techniques to identify scratched or abraded cans. Such techniques, whether manual or automatic, are extremely expensive. Applicant is unaware of any cost effective, reliable inspection techniques for this purpose.

The present invention completely overcomes the problem of the flat rail of rotary cookers damaging the protective surface of newer style chamfered cans. The present invention provides a rotary cooker rail having a design which inherently avoids frictional engagement between the rail and the side wall of the can, whether the can is a new style chamfered can or an old style can having outwardly projecting seams along their top and bottom edges. The present invention allows the newer chamfered cans to be used safely in a continuously operating rotary cooker without requiring the use of heavier gauge cans or thicker protective coatings on the cans. The improved cooker rail may be retrofitted into some of the existing rotary cookers in use. The present invention also makes it unnecessary to utilize batch cooking equipment when cooking or sterilizing products in the newer style chamfered cans.

It is therefore a primary object of the present invention to provide an improved rotary cooker utilizing a novel rail design which essentially eliminates the problem of damage caused to the side wall of chamfered cans by frictional engagement with the rotary cooker rail.

Another object of the invention is to provide an improved rotary cooker rail which allows continuous rotary cookers to process either the more modern style chamfered can or the older style cylindrical can without any significant risk of damaging the side wall of the can by frictional engagement with the cooker rail.

A further object of the invention is to avoid the necessity of utilizing a batch process cooking technique for the cooking or sterilizing of products in the newer style chamfered tin cans.

A further object of the invention is to facilitate the use of a continuous rotary cooker for processing chamfered and stackable tin cans without requiring a significant increase in the thickness of the side wall of the can or in the thickness of the protective coating on the exterior surface of the can.

Further objects and advantages of the invention will become apparent from the following description and drawings wherein:

DETAILED DESCRIPTION OF THE DRAWINGS

The present invention may be utilized in virtually any prior art continuous rotary cooker wherein a plurality of cans containing food product is moved through a helical pathway that winds around a horizontal axis in a heated chamber. Such machines are commercially available from H.G. Molenaar & Company (Pty) Ltd. of South Africa, having a Web site at hgmolenaar.co.za A complete description of a rotary cooker is available from H.G. Molenaar & Company (Pty) Ltd., is not necessary to an understanding of the present invention and is not given here for the sake of brevity. Rotary cookers are also available from other suppliers and examples of those rotary cookers are shown in U.S. Pat. Nos. 3,495,523; 3,563,161 and 5,535,916, all of which are incorporated herein by reference.

Figures 1A, 1B:
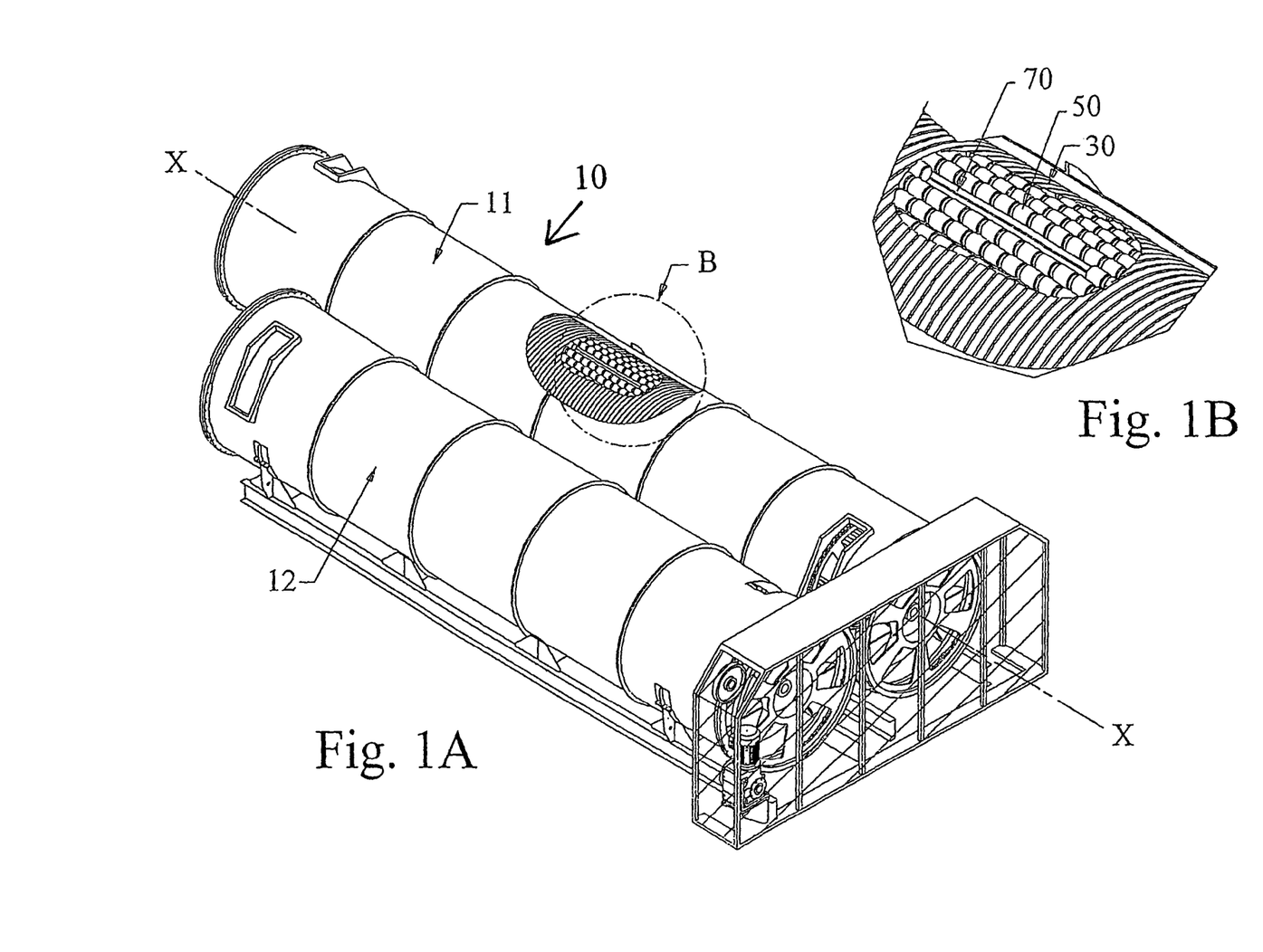
FIG. 1A is a perspective view of a typical rotary cooker shown partially broken away to illustrate some of the inner components of the cooker.
FIG. 1B is an enlargement of portion B of FIG. 1A.

FIGS. 1A and 1B illustrate a typical rotary cooker 10 having two elongated and parallel chambers 11 and 12. Chambers 11 and 12 may be of the order of ten meters or more in length and two meters or more in diameter. As shown best in FIG. 1B, an array of helical rails 30 is provided to guide and support the cans 50 as they are conveyed from left to right in FIG. 1A and around horizontal axis X-X. The cans 50 are propelled along helical rails 30 by brackets 70 described below.

The first chamber 11 is heated and cooks the food product in cans moving through it. The second chamber 12 may be used to cool the cans 50 and convey the cans from right to left in FIG. 1A. The can feed, transfer and discharge mechanisms are not part of the present invention, are known in the art and therefore not shown or described herein.

Figure 2:
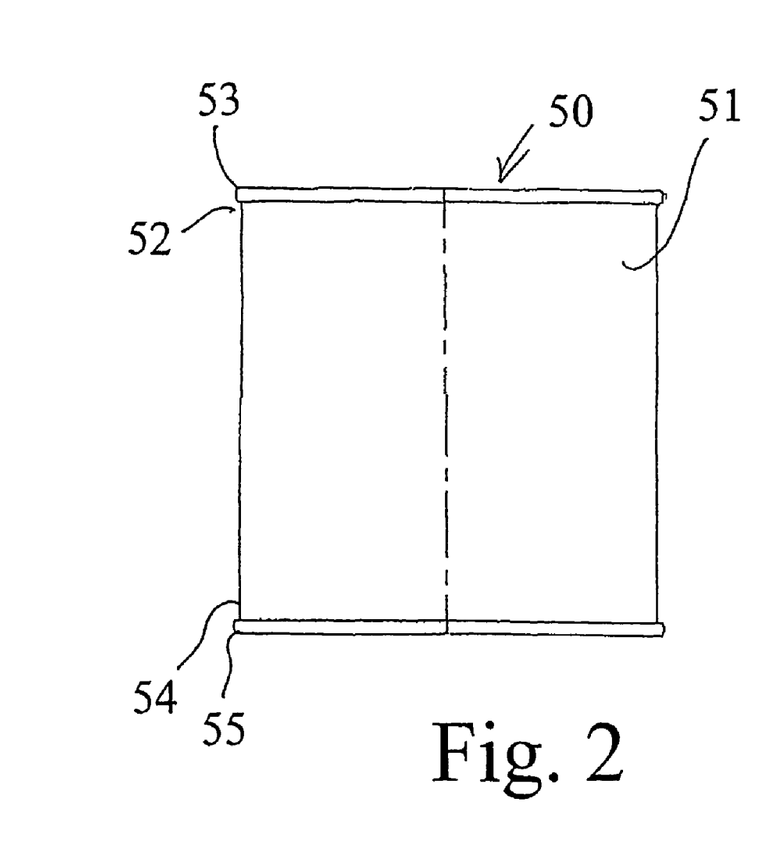
FIG. 2 is a side elevational view of an older styled cylindrical can with external circumferential beads around the top and bottom of the can.

FIG. 2 illustrates the older style can 50 having a cylindrical body 51 and an upper or first end 52 having a radially outwardly extending circumferential bead 53. Can 50 has a second or lower end 54 also having a radially outwardly extending circumferential bead 55. The cylindrical and double beaded can 50 is not easily stackable compared with the newer, stackable chamfered designs, such as 150 shown in FIG. 3 or can 650 shown in FIG. 11.

Figure 3:
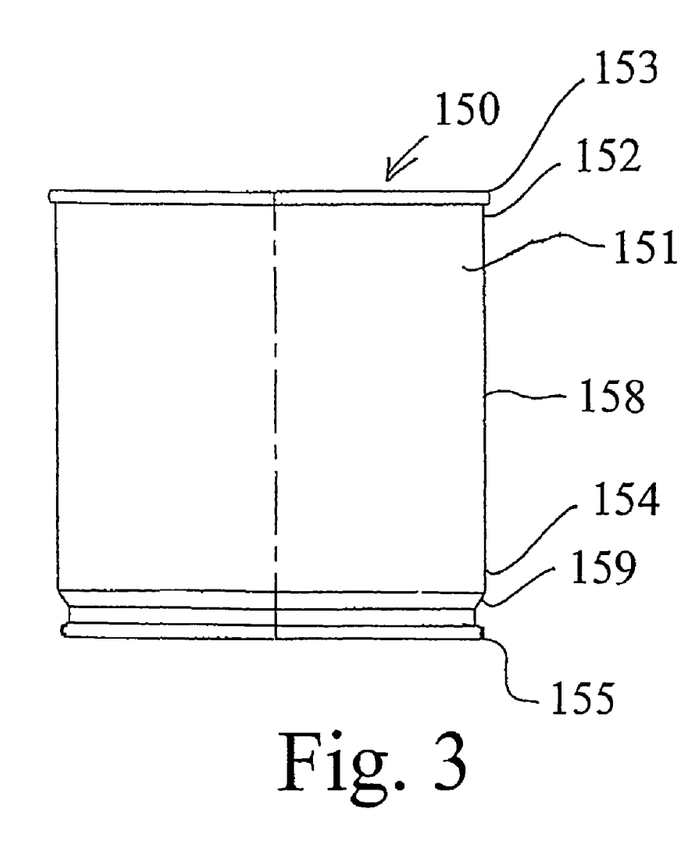
FIG. 3 illustrates a newer design chamfered can known in the prior art, but to which the present invention pertains.
Figure 11:
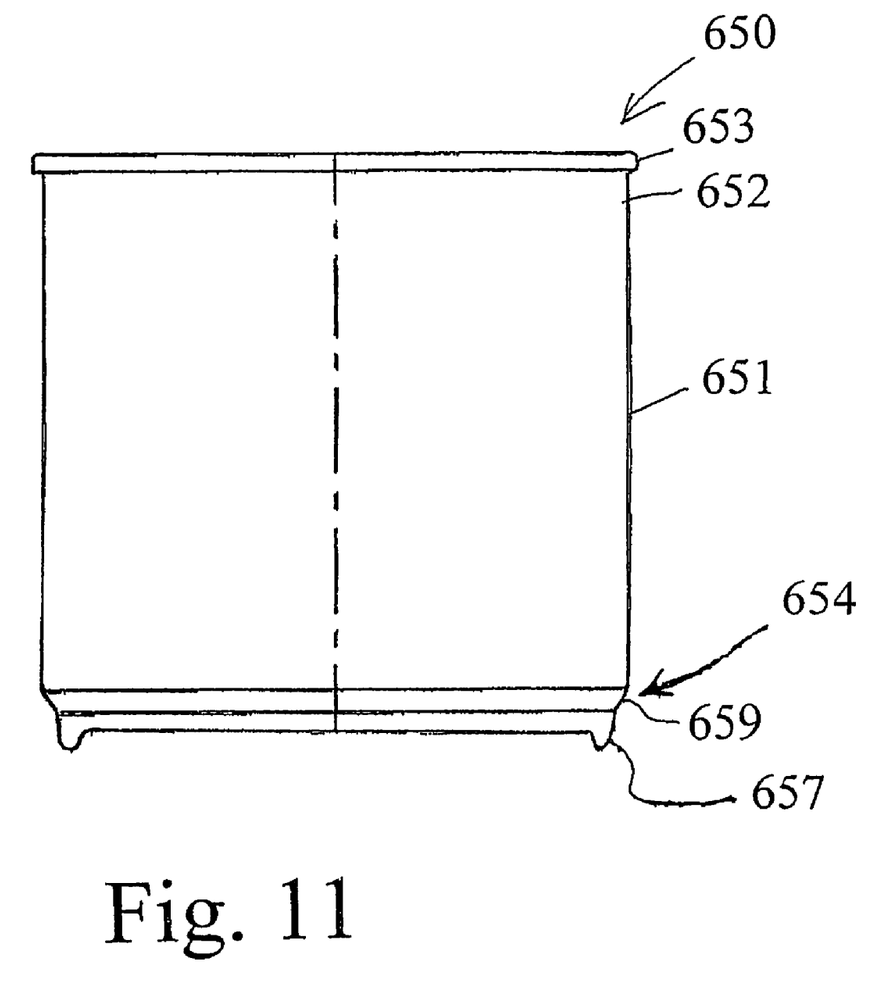
FIG. 11 illustrates a two part chamfered and stackable can.

As shown in FIG. 3, one type of the newer chamfered can 150 has a cylindrical body 151 and a chamfered lower surface or segment 159. Can 150 has an upper or first end 152 with a radially outwardly extending and external circumferential bead 153 that extends radially beyond the side wall 158 of the can 150. Can 150 has a second or lower end 154 which has a chamfered or inwardly beveled surface 159. The second or lower end 154 has a bead or external seam 155 which does not extend radially outwardly beyond the vertical side wall 158 of can 150. The chamfered or beveled surface 159 of can 150 allows the can to be stackable because the lower bead 155 can be stacked on top of another identical can and the lower bead 155 will nest inside the upper bead 153 of a similar can. The chamfered can design shown in FIG. 3 is a three part can (a top, a bottom and the cylindrical side wall) and is becoming ever more popular because of its ease of storage and handling. Other chamfered, stackable can designs having two parts may be utilized with the present invention; such two part design is shown in FIG. 11 and is described below.

Figure 4:
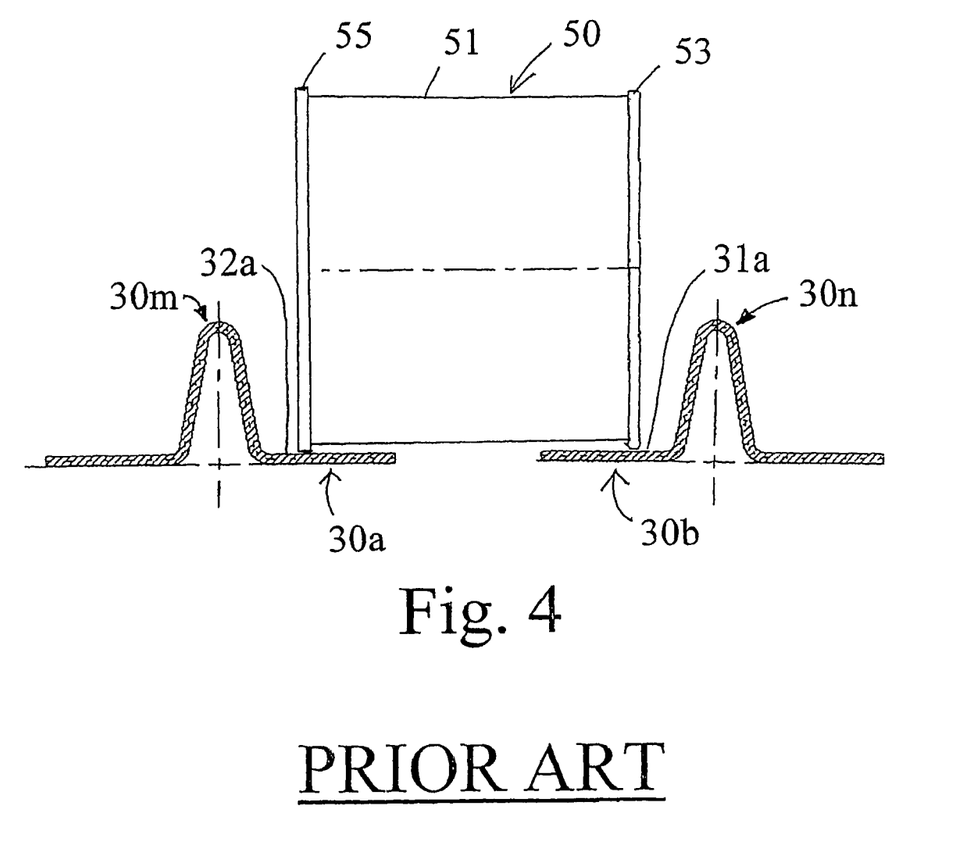
FIG. 4 is a schematic representation illustrating how a prior art cooker rail interacts with an older styled can.

FIG. 4 illustrates schematically how an older style can 50 interacts with a prior art split rail having first and second flat sections 30a and 30b, respectively. Rail sections 30a and 30b are formed in separate rail segments 30m and 30n. Rail sections 30a and 30b have flat surfaces 31a and 32a upon which the outwardly extending and external beads 53 and 55, respectively, each roll as the cans are conveyed through the rotary cooker. The upper and lower beads 53 and 55 hold the side wall 51 of can 50 away from the rail surfaces 31a and 32a to prevent abrasion of the side wall of the can.

Figure 5:
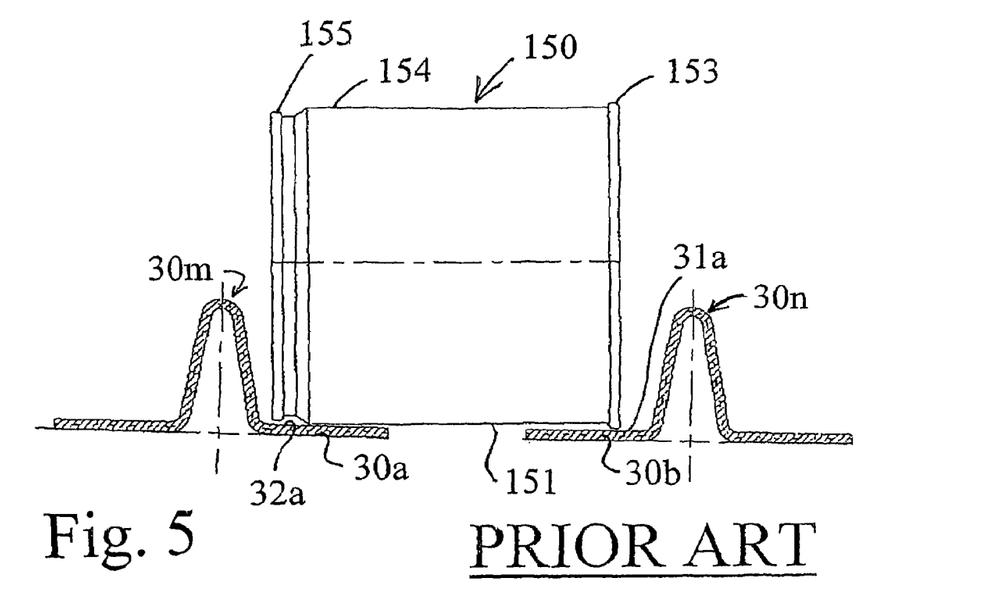
FIG. 5 is a schematic illustration showing how the newer styled chamfered can illustrated in FIG. 3 interacts with a prior art cooker rail.

FIG. 5 illustrates the problem encountered when a newer style chamfered can 150 is utilized in conjunction with prior art flat rail sections 30a and 30b. The upper bead 153 contacts the flat track 31a and holds the side wall 151 away from the surface of the flat track 31a. However, since the lower bead 155 of chamfered can 150 is radially recessed, the lower side wall 154 of can 150 rolls against and frictionally engages the flat surface 32a of track section 30a. This contact and frictional engagement causes the problem described above. It is significant to note that the typical protective coating for the surface of can 150 is only nine or ten microns thick. This is a relatively thin protective coating which is relatively easy to abrade and/or pierce by frictional engagement with a metal rail.

Figure 6:
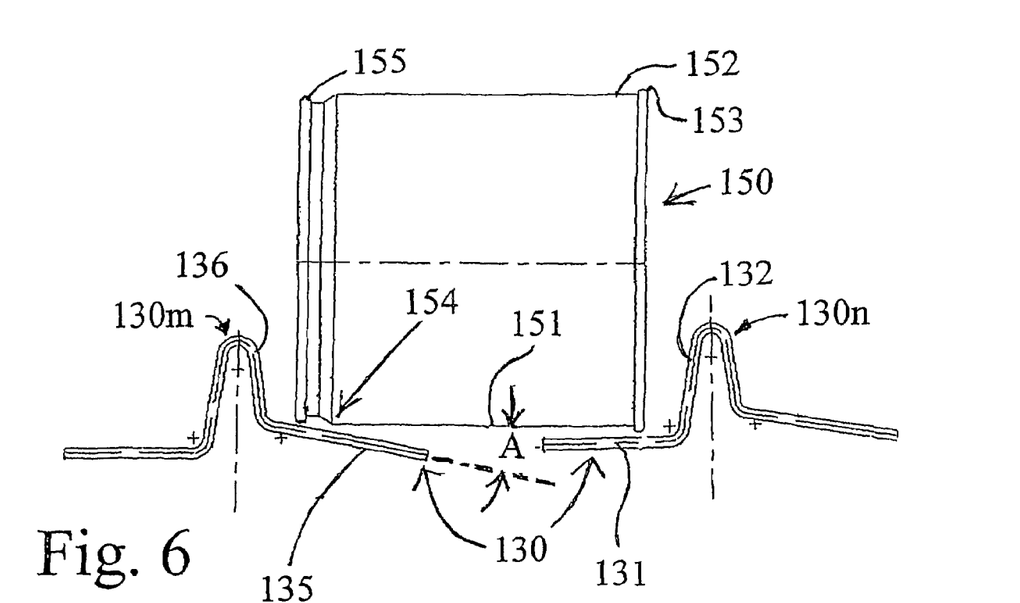
FIG. 6 illustrates how the improved rail according to the present invention interacts with the chamfered can illustrated in FIGS. 3 and 5.

FIG. 6 illustrates a preferred embodiment of the rotary cooker rail of the invention shown generally as 130 and how it interacts with chamfered can 150. The rail 130 is a two part split guide rail having a first section 131 formed in rail segment 130n and which is preferably a generally flat track for carrying the first end 152 of can 150 by supporting and carrying the outwardly projecting bead 153. The phrase "generally flat track" means a track sufficiently flat that the side wall of a can does not contact the rail when bead 153 is rolling on the track. The first section carries a flange 132 which is preferably an inverted U-shaped segment that extends upwardly from the generally flat track 131. The purpose of flange 132 is to limit any side-to-side motion of can 150 as it progresses through the rotary cooker.

The two part split guide rail 130 includes a second section 135 formed in rail segment 130n and which is a downwardly inclined section 135 of track (as shown in FIG. 6) for carrying the chamfered, lower end 154 of can 150. The inclined track section 135 makes contact with the lower bead 155 of the three part can 150 (or with the chamfered surface 659 or ridge 657 of the two part can 650 described below and shown in FIG. 11) and holds the side wall 151 of can 150 upwardly and out of contact with either the generally flat track section 131 or the inclined track section 135. Inclined track section 135 forms an angle A with the side wall 151 of can 150, dependent on the can design, but sufficient to preclude contact with 151 and is, most preferably, approximately 10°. Angle A preferably is between 5° and 20°, but angle A may range from 3° to 45°

The second track section 135 carries a flange 136 which is an upwardly extending, generally inverted U-shaped segment. The purpose of flange 136 is to limit the side-to-side motion of the cans as they are propelled through the rotary cooker.

Figure 7:
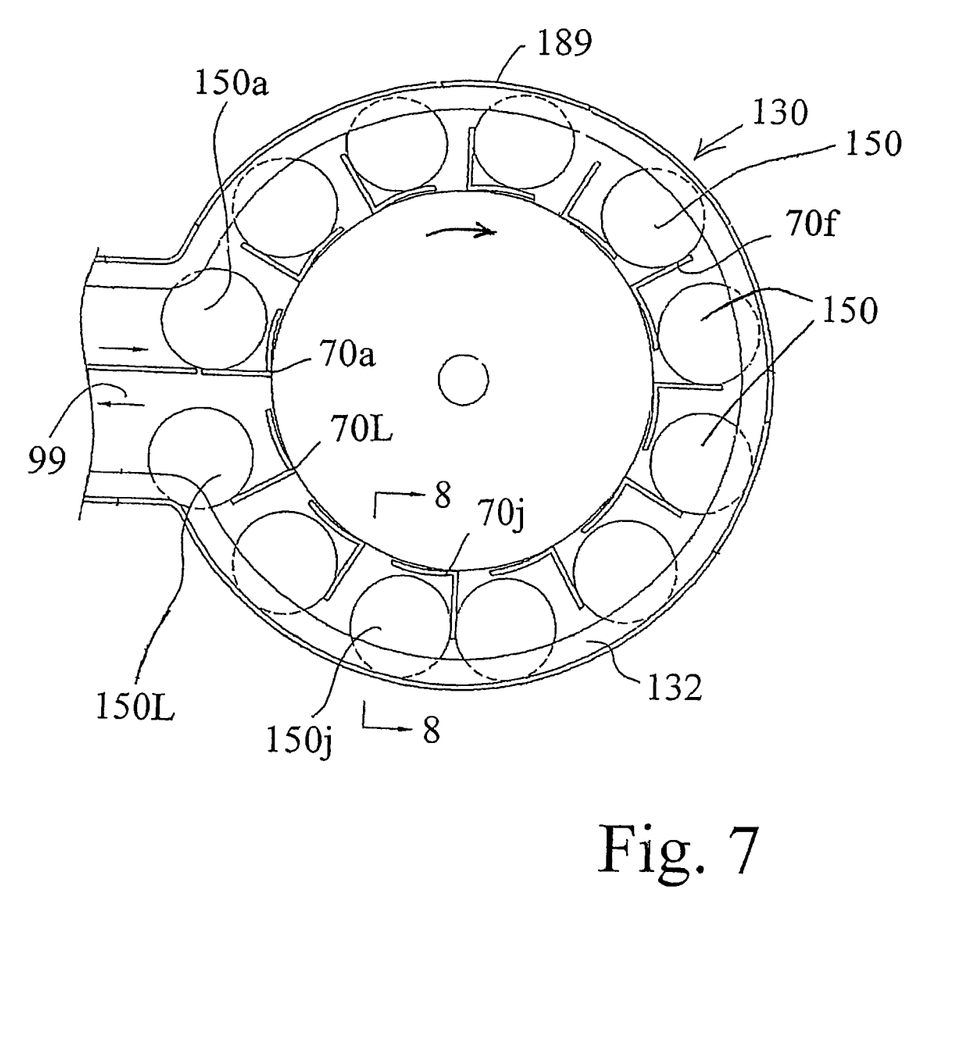
FIG. 7 is a schematic illustration showing how cans interact with a two-part split rail embodiment of the present invention in a rotary cooker.
Figure 8:
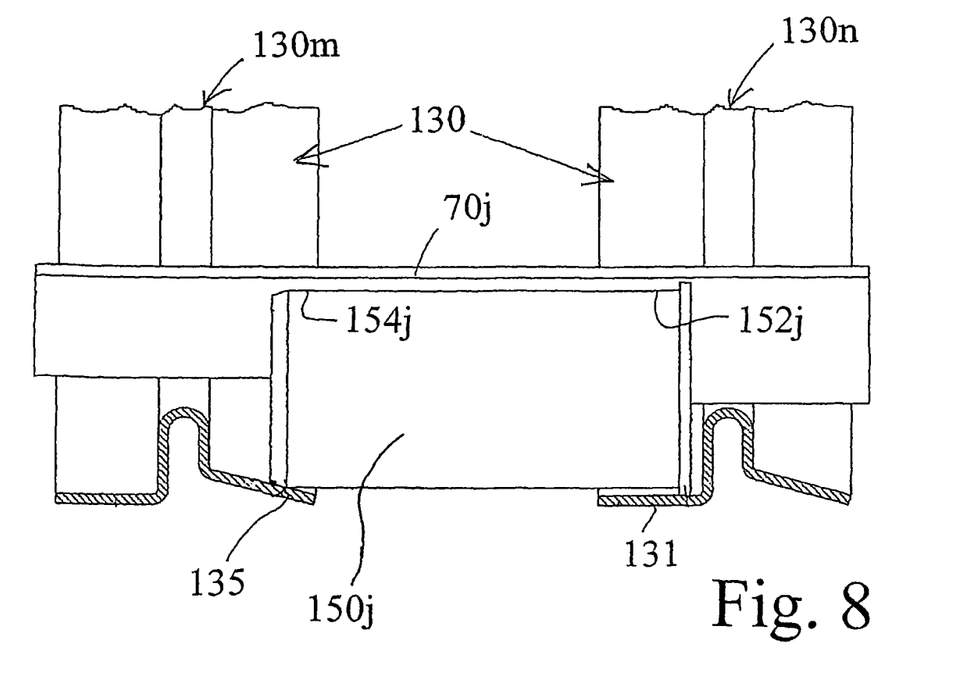
FIG. 8 is a section on the line 8-8 of FIG. 7.

FIG. 7 is a schematic representation illustrating a single loop of the helical track 130 including rail segments 130m and 130n (FIG. 8). It is to be understood that the helical track utilized in the cooker shown in FIG. 1, for example, extends through many series of loops along its length, and typically is large enough to carry many more cans (50 to 100 for example) in a single loop. FIG. 7 shows only a single loop with a small number of cans for clarity in describing the interaction of cans 150 with the split guide rail 130 of the invention. FIG. 7 is best explained in conjunction with FIG. 8 which is a sectional view on the line 8-8 of FIG. 7. As shown in FIGS. 7 and 8, cans 150a-150L are shown with can 150a entering the single loop illustrated in FIG. 7. Can 150L is shown as it is about to be discharged from the single loop illustrated in FIG. 7. A series of L-shaped brackets 70a through 70L propel cans 150a-150L around the loop shown in FIG. 7. Bracket 70j is shown in FIG. 8. FIG. 8 illustrates can 150j with its upper end 152j riding on the flat, first section 131 of split guide rail shown generally as 130. The second chamfered end 154j of can 150j is shown being carried by a second inclined section 135 of split guide rail 130. The L-shaped bracket 70j propels the can 150j as it moves from its lowermost position illustrated in FIG. 7 until can 150j is discharged along the path of arrow 99.

As shown in FIG. 7, L-shaped bracket 70*a* is beginning to propel can 150*a* upwardly until can 150*a* reaches the top 189 of the loop of FIG. 7. When the can reaches the position shown by can 150*d*, the can has rolled forwardly by gravity until it contacts the rear of L-shaped bracket 70*f*. The L-shaped brackets 70*a*-70L cooperate with the guide rail 130 to move the cans through the rotary cooker.

Figure 9:
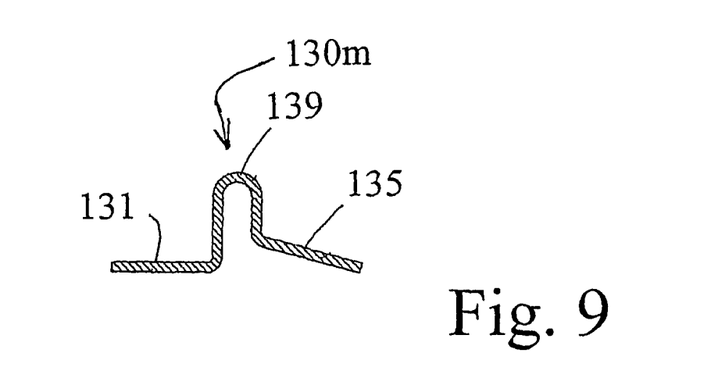
FIG. 9 is a sectional view of a rail segment utilized in the split rail embodiment shown in FIGS. 7 and 8.

The novel rail of the present invention may be utilized to convey the older style can 50 shown in FIG. 2, the three part chamfered, stackable can 150 shown in FIG. 3, the two part, chamfered and stackable can, shown in FIG. 11 and described below, and other chamfered, stackable cans. As shown in FIG. 9, the novel rail segment 130*m* of the invention is preferably formed as an individual rail segment including a flat track 131, an inclined track 135, and a single, inverted U-shaped flange 139 between tracks 131 and 135. As described above, and shown best in FIG. 8, individual rail segments 130*m* and 130*n* cooperate to form the split, two part rail 130. The flanges are shown as generally inverted U-shaped segments but alternate shapes may be utilized. The primary reason for using the rail segments 130*m* and 130*n*, each having a generally inverted U-shape, is so that a single rail segment, as illustrated in FIG. 9, may be utilized to support the first end of one can and the second end of a can in an adjacent row of cans. A very efficient rail design is thereby provided wherein multiple rows of cans are conveyed simultaneously and wherein n rows of cans are supported and guided by n+1 individual, transversely spaced rail segments.

Figure 10:
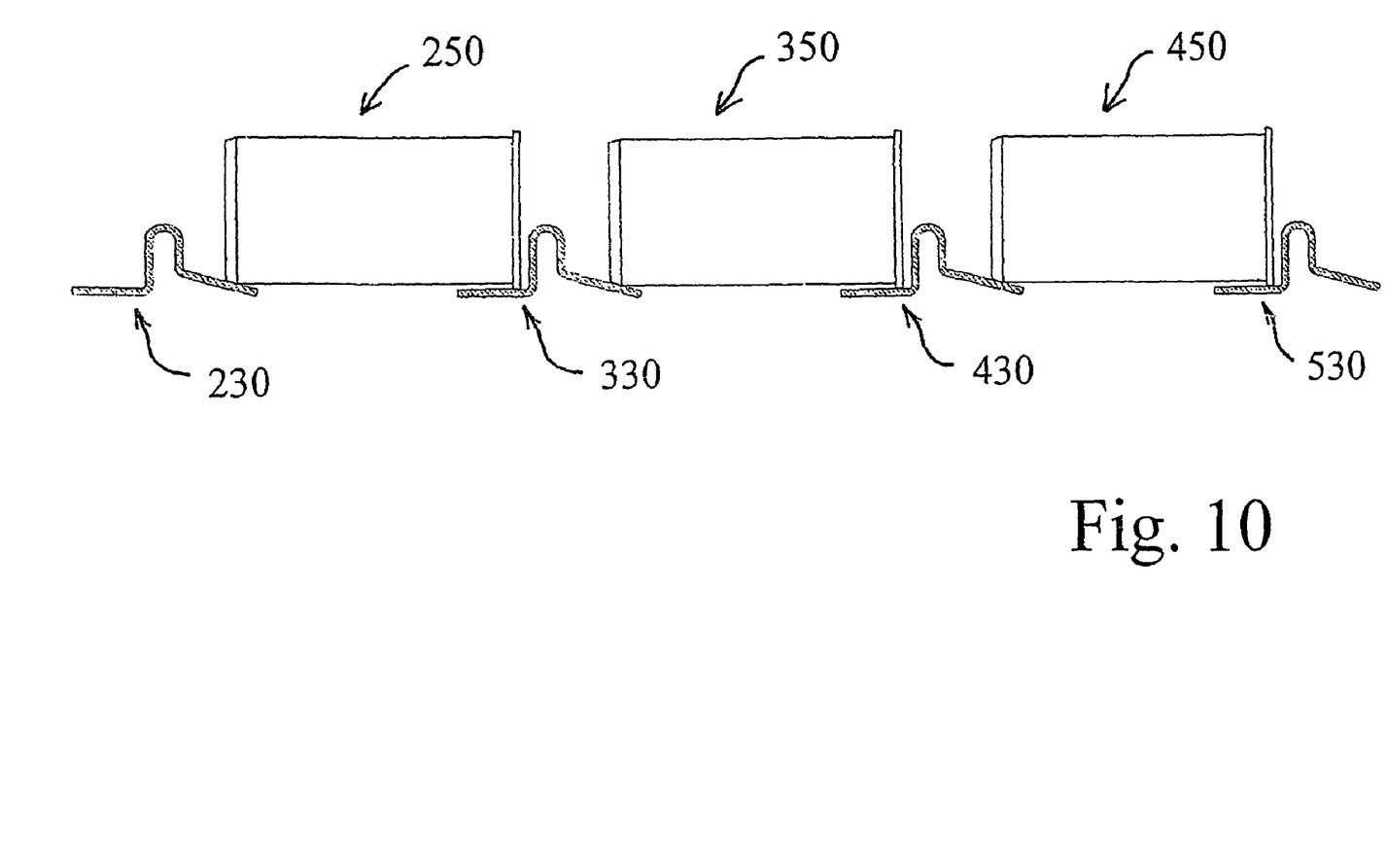
FIG. 10 is a schematic illustration showing a plurality of rows of cans moving on and guided by the split rail embodiment of the present invention.

FIG. 10 illustrates three rows of cans 250, 350 and 450 supported by four separate individual rail segments 230, 330, 430 and 530. The individual rail segments, as illustrated in FIG. 9, may be removably attached to the outer wall of the rotary cooker or may alternately be welded to the outer wall of the cooker. The preferred means of attachment is a removable attachment such as bolts to allow the periodic changing of the rail. The removable connectors such as bolts allow some existing rotary cookers to be retrofitted with the novel rail of the present invention.

FIG. 11 illustrates a two part, chamfered and stackable can 650. One part of the can 650 includes side wall 651 which is cylindrical, and is integrally formed with the bottom of the can, shown generally as 654, typically by a stamping process. A radially outwardly extending circumferential bead 653 is formed at the top 652 of side wall 651. The top or lid of the can 650 (not visible in FIG. 11) is the second part of the can 650. Chamfered surface 659 is provided at the lower, second end 654 of can 650. A downwardly extending ridge 657 is formed adjacent chamfered surface 659. Ridge 657 and chamfered or beveled surface 659 cooperate to make can 650 stackable. The present invention prevents damage to side wall 651 of can 650 since side wall 651 is held above and out of contact with the inclined track of the rail, as described above. Either the chamfered surface 659 or ridge 657 contacts the inclined track, both of which are more resistant to abrasion or damage than side wall 651.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

The invention claimed is:

1. A rotary cooker and/or sterilizer wherein a plurality of cans containing food product are continuously moved along a helical pathway around a horizontal axis in a heated chamber, each of said cans having a first end with a radially outwardly extending circumferential bead and a second end with chamfered surface to facilitate stacking of said cans for storage and handling wherein said first and second ends of said cans are carried by and roll against a rail, comprising:

said rail having first and second sections, said first section including a flat track for carrying said first end of said cans with said radially outwardly extending circumferential bead so that a side wall of said can does not contact said track, said first section carrying a flange for limiting side-to-side motion of said cans, said second section including an inclined track for contacting and carrying said chamfered, second end of said cans so that a no part of the side wall of said chamfered can contacts said inclined track, wherein said inclined track is inclined in a direction perpendicular to the direction in which the can moves, wherein said inclined track forms an angle A with the side wall of said cans, said angle A being between 5° and 20°, and said second section carrying a flange for limiting the side-to-side motion of said cans.

* * * * *